United States Patent
Bordogna et al.

(10) Patent No.: US 7,593,327 B2
(45) Date of Patent: Sep. 22, 2009

(54) METHOD AND APPARATUS FOR FREQUENCY OFFSET CONTROL OF ETHERNET PACKETS OVER A TRANSPORT NETWORK

(75) Inventors: Mark A. Bordogna, North Andover, MA (US); Adam B. Healey, Newburyport, MA (US); Peter A. Stropparo, West Newbury, MA (US)

(73) Assignee: Agere Systems Inc., Allentown, PA (US)

( * ) Notice: Subject to any disclaimer, the term of this patent is extended or adjusted under 35 U.S.C. 154(b) by 979 days.

(21) Appl. No.: 10/643,005

(22) Filed: Aug. 18, 2003

(65) Prior Publication Data

US 2005/0041695 A1 Feb. 24, 2005

(51) Int. Cl.
*H04J 3/06* (2006.01)

(52) U.S. Cl. .................. 370/230; 370/235; 370/504

(58) Field of Classification Search .......... 370/230, 370/231, 232, 233, 234, 235, 338, 503, 504, 370/505, 507, 509, 510, 511, 512, 513, 514, 370/528

See application file for complete search history.

(56) References Cited

U.S. PATENT DOCUMENTS

| | | | | |
|---|---|---|---|---|
| 4,849,969 | A * | 7/1989 | Annamalai | 370/517 |
| 4,849,970 | A * | 7/1989 | McCool | 370/517 |
| 6,226,290 | B1 * | 5/2001 | Salett et al. | 370/389 |
| 6,937,624 | B1 * | 8/2005 | Gavin | 370/528 |
| 7,002,941 | B1 * | 2/2006 | Treadaway et al. | 370/338 |
| 7,061,866 | B2 * | 6/2006 | Connor | 370/235 |
| 7,089,485 | B2 * | 8/2006 | Azadet et al. | 714/798 |
| 2002/0034195 | A1 | 3/2002 | Chen et al. | |
| 2004/0202198 | A1 * | 10/2004 | Walker et al. | 370/474 |

FOREIGN PATENT DOCUMENTS

GB 2 362 303 A 11/2001

OTHER PUBLICATIONS

"Generic Framing Procedure (GFP)," International Telecommunication Union, ITU-T G.7041/Y.1303—Prepublished Verion, Telecommunication Standardization Sector of ITU, Series G: Transmission Systems and Media, Digital Systems and Networks, Series Y: Global Information Infrastructure and Internet Protocol Aspects, Internet Protocol Aspects—Transport (Dec. 2001).

Scholten et al., "Rate Adaptation in Transparent GFP Mapping," Contribution to T1 Standards Project, XX, XX, pp. 1-7 (Mar. 26, 2001).

* cited by examiner

*Primary Examiner*—Chi H. Pham
*Assistant Examiner*—Kevin Mew
(74) *Attorney, Agent, or Firm*—Ryan, Mason & Lewis, LLP (57) ABSTRACT

A method and apparatus are disclosed for compensating for a frequency offset between an ingress local area network and an egress local area network that communicate over a transport network. The bandwidth of an egress port is adjusted by varying an inter-packet gap size between each packet so that the packets can be delivered without overflowing an egress buffer. The size of the inter-packet gap is reduced when the frequency of the ingress local area network is greater than the frequency of the egress local area network. The size of the inter-packet gap is increased when the frequency of the ingress local area network is less than the frequency of the egress local area network. The size of the egress inter-packet gap may be statically or dynamically adjusted to compensate for a frequency offset.

20 Claims, 6 Drawing Sheets

METHOD AND APPARATUS FOR FREQUENCY OFFSET CONTROL OF ETHERNET PACKETS OVER A TRANSPORT NETWORK

FIELD OF THE INVENTION

The present invention relates generally to frequency offset techniques for a communications network, and more particularly, to techniques for compensating for a frequency offset between source and destination nodes, such as local area networks, involved in a packet flow over a transport network.

BACKGROUND OF THE INVENTION

Communication networks transfer information, such as data, voice, text or video information, among communication devices connected to the networks. Most enterprises employ local area networks (LANs), such as those based on the Ethernet protocol, to interconnect the various devices within the enterprise. Most LANs are connectionless, where data is transmitted without error to a high degree of probability, but there is no guarantee of delivery. If data is not properly received, the receiving station will simply discard the data without notifying the sender.

In addition, even when data is successfully transmitted over a transport network, data can be lost due to buffer unavailability at the receiving station. If a receiving station is unable to receive and process data at a rate greater than or equal to the transmission rate of the transmitting station, the buffer at the receiving station can overflow. The loss of data due to buffer unavailability has the same effect as a frame that is lost due to a bit error. Thus, it is desirable to suspend or reduce the arrival of data packets rather than permit an overflow condition to occur at the buffer. A number of techniques have been proposed or suggested for flow control in LANs.

The IEEE 802.3x data communication protocol specifies a port-based flow control arrangement for full duplex Ethernet links based on a flow control message, such as a "pause" frame. A transmitting station that receives the pause frame enters a pause state in which the transmission of frames on the network is suspended for a specified time, thereby relieving congestion at the receiver. This port-based flow control arrangement, however, requires significant buffering and can significantly lower the average bandwidth.

A number of LANs are often connected in a larger network, such as a wide area network (WAN). While the Ethernet protocol is well suited to the LAN environment, the Ethernet protocol is not a viable option for WANs, primarily because the Ethernet collision avoidance mechanism limits the permissible distance of the furthest station and privacy issues related to separation of traffic over a transport network. Thus, in order to permit communication between LANs in an efficient, seamless and reliable manner, high-speed transport links between various LANs was needed.

In order to meet increased bandwidth demands, fiber optic systems, such as Synchronous Optical Networks (SONETs), are often employed as transport links in a WAN. If an egress LAN that is receiving packets from a remote transmitting station over a WAN link is unable to receive and process the packets at a rate greater than or equal to the transmission rate of the ingress LAN, the buffer associated with the egress LAN can overflow. Thus, when a frequency offset exists between the egress and ingress LANs, such that the frequency of the ingress LAN exceeds the frequency of the egress LAN, the egress buffer will eventually overflow.

A need therefore exists for a method for compensating for frequency differences between the ingress and egress Ethernet frequencies of a transport link. When transporting packets between an ingress and egress LAN, a further need exists for maintaining lossless service regardless of any differences in the ingress and egress Ethernet frequencies, regardless of the speed of the Ethernet connection (e.g., 10 Mbps, 100 Mbps, or 1 Gbps).

SUMMARY OF THE INVENTION

Generally, a method and apparatus are disclosed for compensating for a frequency offset between an ingress local area network and an egress local area network communicating over a transport network. The ingress local area network employs an inter-packet gap between each packet in a packet flow. The size of the egress inter-packet gap is adjusted to compensate for the frequency offset.

The egress inter-packet gap size can be varied, for example, by adjusting the number of bytes included in the egress inter-packet gap or by writing the inter-packet gap at a faster rate from the egress port and deleting idle symbols from the inter-packet gap as they are transmitted to the local area network. For example, in a static implementation, the size of the inter-packet gap is reduced at the egress port to a size smaller than the size of an ingress inter-packet gap. In a dynamic implementation, the level of an egress buffer is monitored and the size of the inter-packet gap at the egress port is adjusted to maintain the level of the egress buffer within a desired range.

A more complete understanding of the present invention, as well as further features and advantages of the present invention, will be obtained by reference to the following detailed description and drawings.

DETAILED DESCRIPTION

Figure 1:
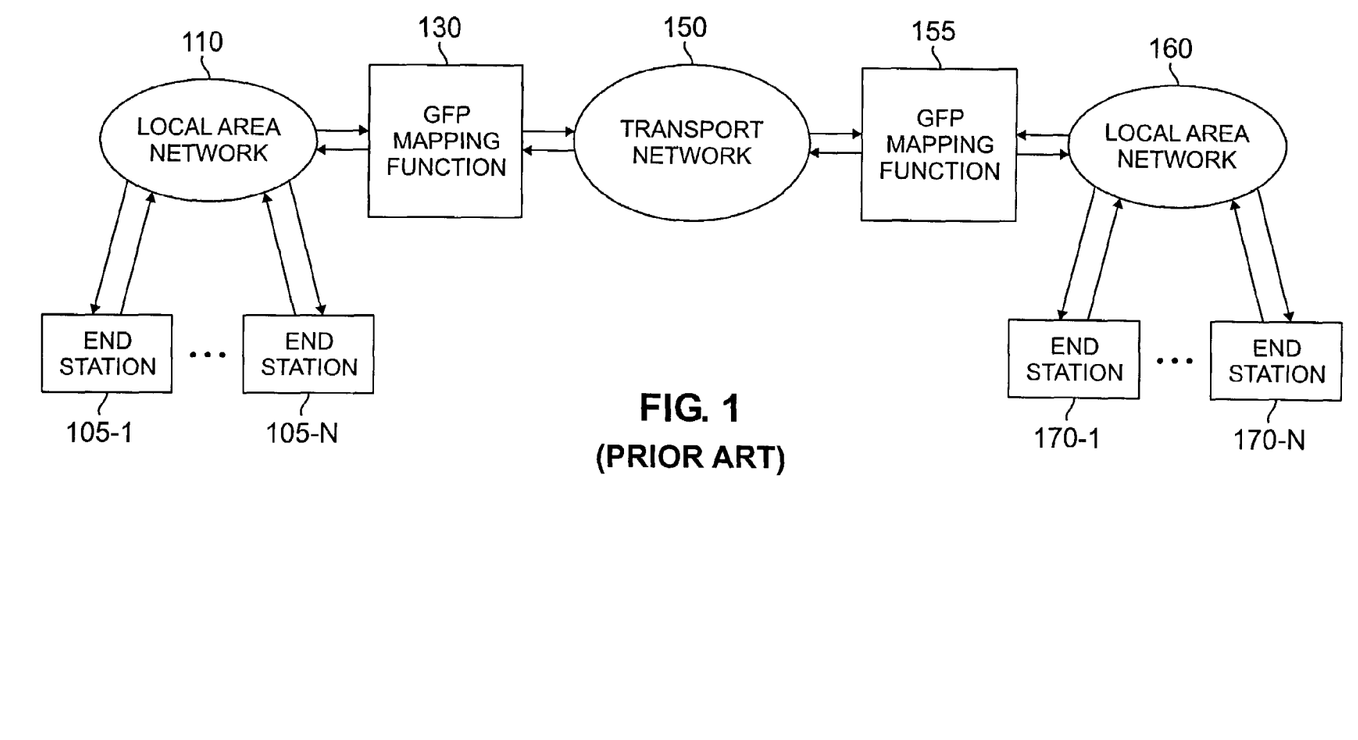
FIG. 1 illustrates a conventional transport network environment for communicating packets between ingress and egress local area networks.

FIG. 1 illustrates a conventional transport network 150 for communicating packets between an ingress local area network 110 and an egress local area network 160. The transport network 150 may be embodied, for example, as a SONET network, a Synchronous Digital Hierarchy (SDH) network or an Optical Transport Network (OTN). While the present invention is illustrated herein in the context of an exemplary SONET network 150 that transports Ethernet packets, the present invention may be employed in any optical transport network that maps asynchronous packets to a constant bit rate stream, for example, using the Generic Framing Procedure (GFP) mapping scheme or the High-Level Data Link Control (HDLC) protocol.

As shown in FIG. 1, a plurality of end stations 105-1 through 105-N connected to local area network 110 can transmit packets over a SONET link 150 to one or more end stations 170-1 through 170-N connected to local area network 160. The local area networks 110, 160 can be based, for example, on the Ethernet protocol, to interconnect the various end stations 105-1 through 105-N within an enterprise. The packets are encapsulated with the Generic Framing Procedure (GFP) mapping scheme which provides a fixed bandwidth overhead for each Ethernet packet. The packets may optionally be aggregated and prepared for transport on the transport network 150 by a GFP mapping function gateway 130 employing the Generic Framing Procedure (GFP) linear mapping scheme. When the packets are encapsulated, the GFP mapping function 130 assembles the asynchronous packets from the Ethernet-based local area network 110 into a constant bit rate stream, suitable for transport over the SONET network 150, in a known manner. Similarly, a GFP mapping function 155 converts the constant bit rate stream received on the SONET network 150 into asynchronous packets suitable for the Ethernet-based local area network 160.

The interface between the transport network 150 and the local area networks 110, 160 is discussed further below in conjunction with FIGS. 3 through 5. Generally, the GFP mapping function 155 has an associated buffer (not shown in FIG. 1) for storing packets for the local area network 160. As discussed below, the buffer accommodates clocking differences between the higher rate transport network 150 and the local area network 110, 160. As previously indicated, when there is a frequency offset between the ingress local area network 110 and the egress local area network 160, such that the frequency of the ingress local area network 110 exceeds the frequency of the egress local area network 160, the egress buffer associated with the GFP mapping function 155 will overflow under high bandwidth conditions.

According to one aspect of the invention, a frequency offset control mechanism is provided to adjust the bandwidth of the egress port so that the packets can be delivered without overflowing the buffer. The Ethernet standard defines an inter-packet gap (IPG) as a recovery period for the remote receiver. An inter-packet gap is a specified number of bytes that are transmitted between each packet. Typically, an inter-packet gap consists of 12 bytes inserted between each packet. The present invention recognizes that the inter-packet gap can be adopted to now provide a frequency offset control mechanism that can adjust the bandwidth of the egress port in the event that the frequency of the ingress local area network 110 exceeds the frequency of the egress local area network 160 for Ethernet services over a GFP mapped transport network.

In particular, the frequency offset control mechanism of the present invention will reduce the number of bytes included in the inter-packet gap when the frequency of the ingress local area network 110 is greater than the frequency of the egress local area network 160, to prevent the egress buffer from overflowing. If the egress port has a slower clock than the ingress port, the additional bandwidth obtained by reducing the size of the inter-packet gap in accordance with the present invention will compensate for the frequency offset. If the egress port has a faster clock than the ingress port, then the inter-packet gap can be extended. It is noted that if there are no packets to send by the ingress local area network, the inter-packet gap will automatically be extended by conventional techniques to fill the idle time.

For example, assuming a normal inter-packet gap of 12 bytes, a static implementation of the frequency offset control mechanism of the present invention can statically reduce the inter-packet gap at the egress port, for example, to 10 bytes. It is noted that in a static implementation of the present invention, the reduced inter-packet gap value is selected on the basis of the worst case frequency offset between the ingress and egress local area networks 110, 160. In a dynamic implementation of the present invention, the actual level of the egress buffer is monitored and the size of the inter-packet gap at the egress port is adjusted accordingly to maintain the level of the egress buffer within a desired range.

Figure 2:
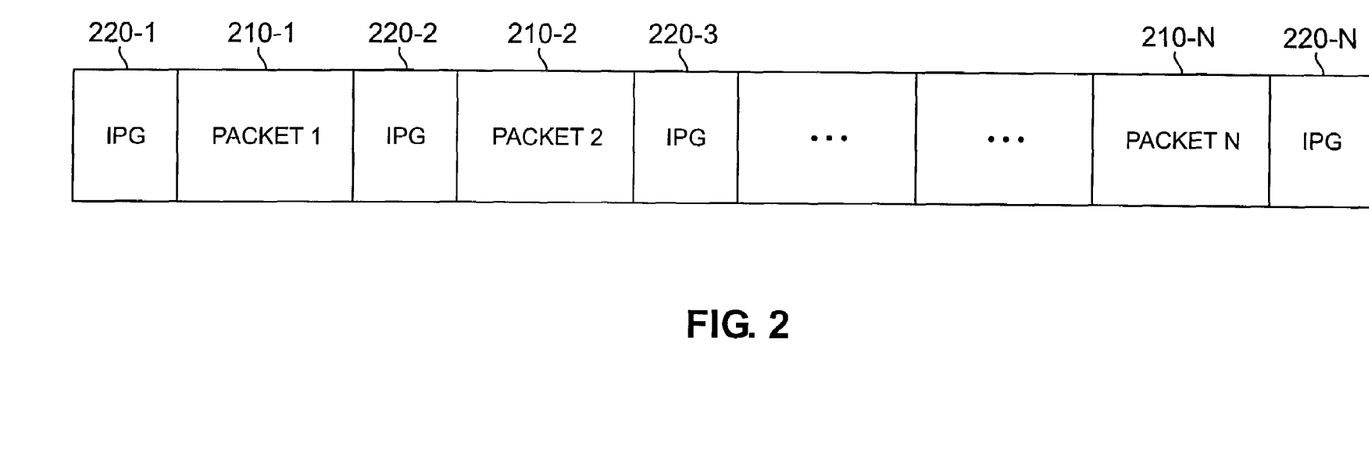
FIG. 2 illustrates a conventional format for a packet flow across the transport network of FIG. 1.

FIG. 2 illustrates a conventional format for a packet flow across the transport network 150 of FIG. 1. As shown in FIG. 2, a conventional packet flow includes a series of packets 210-1 through 210-N, each separated by a corresponding inter-packet gap 220-1 through 220-N. Generally, a packet mapped over a GFP based transport network includes a start of packet indicator, a header (e.g., including address information), a payload (generally consisting of 64 to 1518 bytes) and an end of packet indicator. As previously indicated, the inter-packet gap is typically 12 idle bytes in a conventional Ethernet system.

Figure 3:
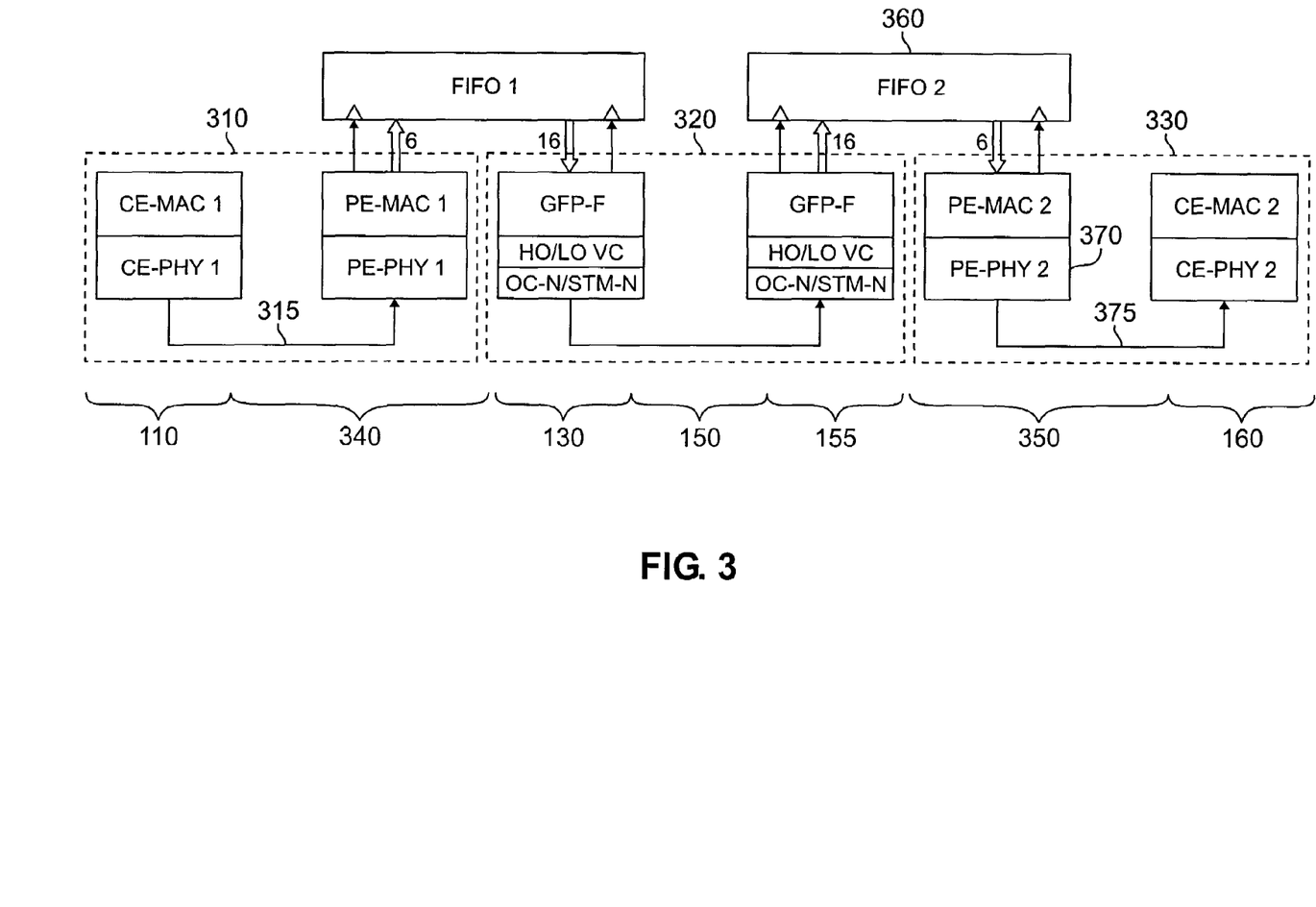
FIG. 3 illustrates a transport network environment according to a static implementation of the present invention.

FIG. 3 illustrates a transport network environment according to a static implementation of the present invention. As shown in FIG. 3, the local area network 110 includes client equipment (CE) that generates packets to be transported over the transport network 150. As previously indicated, each packet is separated by an inter-packet gap that is generally 12 bytes. The inter-packet gap is inserted into the packet stream by the MAC layer (CE-MAC 1) of the client equipment. The physical layer (CE-PHY 1) transmits the packet stream over a wire 315 from the local area network domain to a user-to-network interface (UNI) of the provider equipment (PE). The packet stream on the wire 315 will have the format shown in FIG. 2, with an inter-packet gap of 12 bytes in the exemplary embodiment. It is noted that the equipment shown in the dotted box 310 all operates at the nominal frequency of the local area network 110, which may be, for example, 10 Mbps, 100 Mbps or 1 Gbps (+/−100 ppm).

The ingress provider equipment 340 includes MAC and PHY layers. The physical layer in the ingress provider equipment (PE-PHY 1) drops the inter-packet gap in the packet stream for transport over the network 150, in a known manner. The ingress provider equipment 340 provides the packet stream to a first-in-first-out buffer (FIFO 1). The buffer FIFO 1 provides the packet stream to GFP mapping function 130 at a rate appropriate for the transport network 150, such as the SONET rate of 155.52 MHz for a 1 Gbps Ethernet implementation. As previously indicated, the GFP mapping function 130 assembles the packets from the Ethernet-based local area network 110 into a constant bit rate stream, suitable for transport over the SONET network 150, in a known manner. Following the GFP mapping function 130, the packet stream is processed into a High Order or Low Order Virtual Concatenation (HO/LO VC) group and then placed in a optical carrier structure (OC-N) or a Synchronous Transport Mode (STM-N) structure and is then transported over the transport network 150 to the egress GFP mapping function 155. The equipment shown in the dotted box 320 all operates at the nominal frequency of the transport network 150, which may be, for example, the SONET rate of 155.52 MHz.

As previously indicated, the GFP mapping function 155 has an associated buffer (FIFO 2) 360 for storing packets for the local area network 160. The buffer 360 accommodates clocking differences between the higher rate transport network 150 and the local area network 160. In the presence of a frequency offset between the ingress local area network 110 and the egress local area network 160, such that the frequency of the ingress local area network 110 exceeds the frequency of the egress local area network 160, the egress buffer 360 associated with the GFP mapping function 155 will overflow. It is noted that the frequency of the local area network 160 may each be, for example, 10 Mbps, 100 Mbps or 1 Gbps (+/−100 ppm). Thus, the expected worst-case frequency offset in the exemplary embodiment will be 200 ppm.

The present invention provides a frequency offset control mechanism to adjust the bandwidth of the egress port so that the packets can be delivered to the local area network 160 without overflowing the buffer 360. The present invention reduces the number of bytes in the inter-packet gap to adjust the bandwidth of the egress port in the event that the frequency of the ingress local area network 110 exceeds the frequency of the egress local area network 160.

The egress FIFO buffer 360 provides the packet stream to the egress provider equipment 350 at a rate appropriate for the egress local area network 160. The MAC layer (PE-MAC 2) of the egress provider equipment 350 reintroduces the inter-packet gap between each packet in the packet stream. According to a static implementation of the present invention, the MAC layer (PE-MAC 2) is configured to insert an inter-packet gap having a size that is smaller than the inter-packet gap that was employed by the ingress local area network 110. For example, if the inter-packet gap inserted into the packet stream by the MAC layer (CE-MAC 1) of the client equipment in the ingress local area network 110 was 12 bytes, the inter-packet gap inserted into the egress packet stream by the MAC layer (PE-MAC 2) may be, for example, 10 bytes. The reduced inter-packet gap value is selected on the basis of the worst case frequency offset between the ingress and egress local area networks 110, 160, and size of the inter-packet gap used by the ingress local area network.

The physical layer (PE-PHY 2) 370 in the provider equipment transmits the packet stream over a wire 375 to the egress local area network domain. The packet stream on the wire 375 will have the format shown in FIG. 2, with a reduced inter-packet gap of 10 bytes in the exemplary embodiment. It is noted that the equipment shown in the dotted box 330 all operates at the nominal frequency of the local area network 160, which may be, for example, 10 Mbps, 100 Mbps or 1 Gbps (+/−100 ppm).

Figure 4:
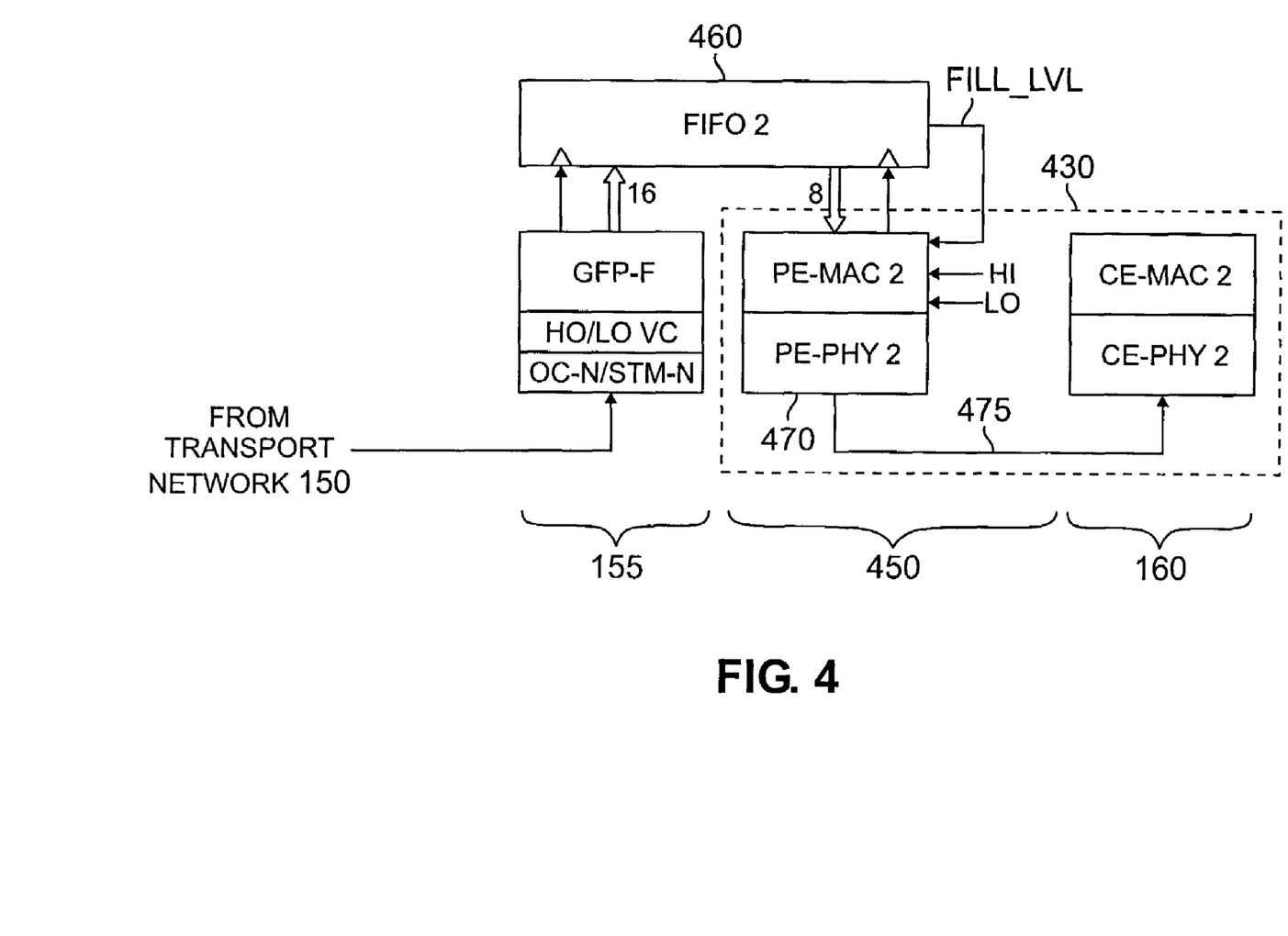
FIG. 4 illustrates an egress portion of the transport network environment according to a dynamic implementation of the present invention.

FIG. 4 illustrates an egress portion of the transport network environment according to a dynamic implementation of the present invention. It is noted that the ingress portion of the transport network environment in a dynamic implementation may be embodied in the same form as described above in conjunction with FIG. 3.

As shown in FIG. 4, according to a dynamic implementation of the present invention, the MAC layer (PE-MAC 2) of the egress provider equipment is provided with an indicator, Fill_Lvl, indicating the instantaneous fill level of the FIFO buffer 460. In addition, the the MAC layer (PE-MAC 2) of the egress provider equipment is provided with an upper threshold, HI, and a lower threshold, LO, that are employed to maintain the level of the egress buffer within a desired range. Thus, the dynamic implementation of the present invention monitors the actual level of the egress buffer 460 and dynamically adjusts the size of the inter-packet gap at the egress port to maintain the level of the egress buffer within the desired range. For example, if the inter-packet gap inserted into the packet stream by the MAC layer (CE-MAC 1) of the client equipment in the ingress local area network 110 was 12 bytes, the nominal inter-packet gap inserted into the egress packet stream by the MAC layer (PE-MAC 2) may be, for example, 10 bytes. When the buffer fill level, Fill_Lvl, is approaching the upper threshold, HI, the inter-packet gap may be reduced to a value lower than 10 bytes. When the buffer fill level, Fill_Lvl, is approaching the lower threshold, HI, the inter-packet gap may be increased to a value greater than 10 bytes. In one variation, the MAC layer (PE-MAC 2) may employ multiple threshold levels each having a corresponding degree of inter-packet gap variation.

The dynamic implementation of the present invention does not necessarily require knowledge of the size of the inter-packet gap employed by the ingress local area network. In addition, the dynamic implementation of the present invention may be preferred where multiple networks are traversed in the end-to-end path between the ingress local area network 110 and the egress local area network 160. In such a case where multiple networks are traversed, the static implementation of the present invention, discussed above in conjunction with FIG. 3, results in a progressive reduction of the inter-packet gap size, with each traversed network. Thus, there is a risk that the inter-packet gap required at the egress port will not have a sufficient minimum size to be processed by a receiver. It is noted that a dynamic implementation of the present invention can be configured to guarantee a minimum required inter-packet gap.

Figure 5:
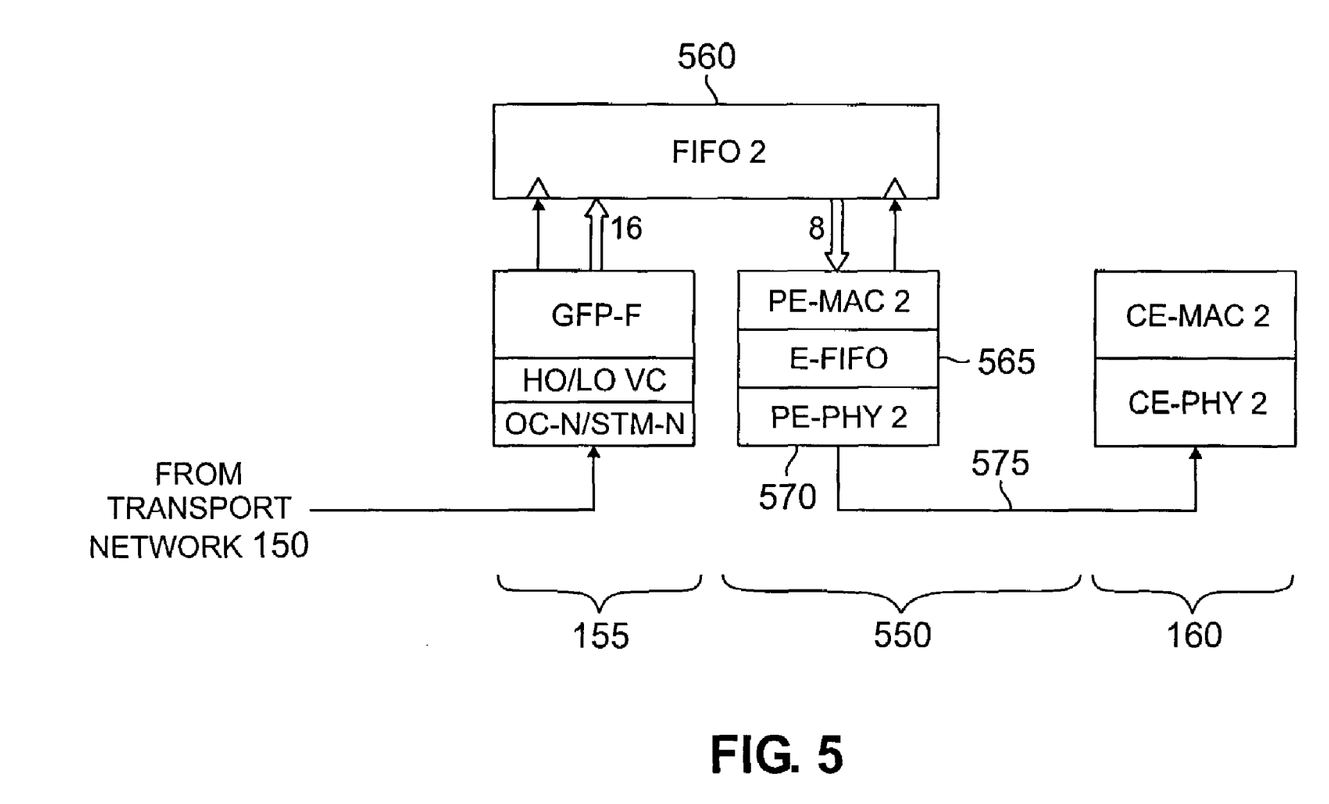
FIG. 5 illustrates an egress portion of the transport network environment according to a "Fast MAC" implementation of the present invention.

FIG. 5 illustrates an egress portion of the transport network environment according to a "Fast MAC" implementation of the present invention. It is noted that the ingress portion of the transport network environment in a dynamic implementation may be embodied in the same form as described above in conjunction with FIG. 3.

The Fast MAC embodiment of the present invention, shown in FIG. 5, operates the MAC layer (PE-MAC 2) of the egress provider equipment at the clock rate of the transport network 150. An elastic FIFO buffer 565 is provided between the MAC (PE-MAC 2) and physical (PE-PHY 2) layers of the egress provider equipment to permit the MAC (PE-MAC 2) layer to operate at the clock rate of the transport network 150 and the physical (PE-PHY 2) layer to operate at the clock rate of the egress local area network 160. The size of the elastic FIFO buffer 565 is selected on the basis of the maximum packet (frame) length. Among other benefits, the Fast MAC embodiment of the present invention does not require knowledge of the frequency or inter-packet gap size employed by the ingress local area network 110.

Figure 6:
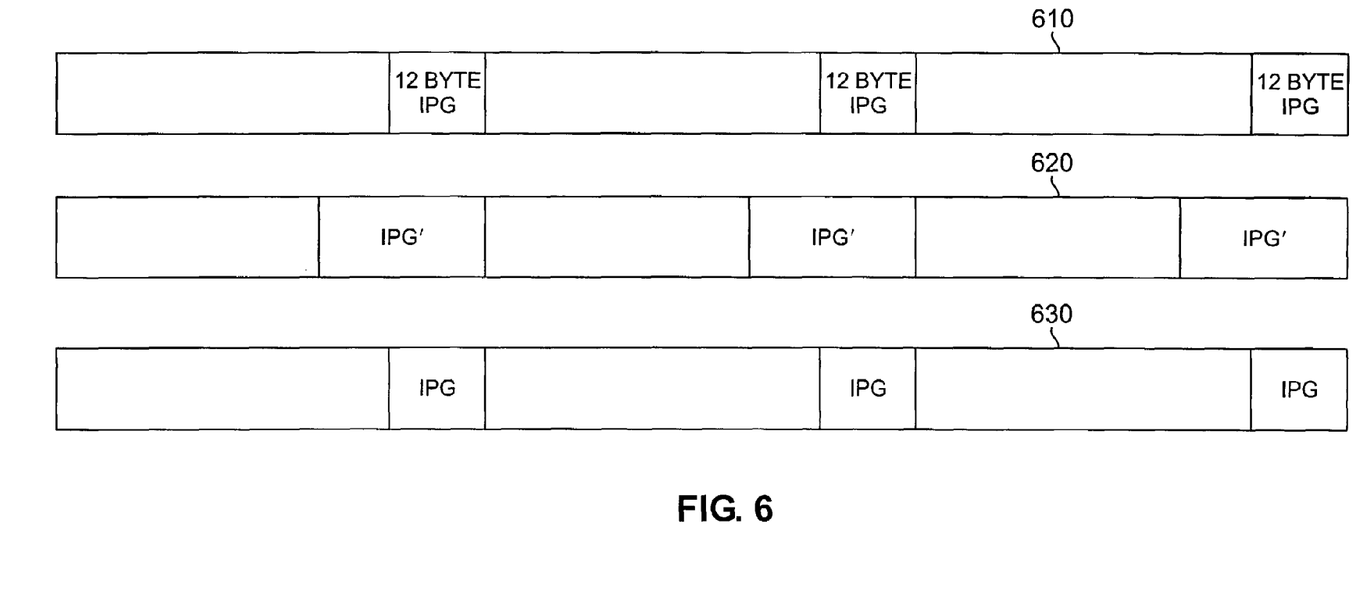
FIG. 6 illustrates the packet flow at various stages of the egress portion of the transport network environment of FIG. 5.

FIG. 6 illustrates the packet flow at various stages of the egress portion of the transport network environment of FIG. 5. Generally, the CE-MAC 1 layer sends a packet flow at the rate of the ingress local area network 110, as shown by the packet stream 610. The PE-MAC 2 layer writes the packet stream into the elastic FIFO buffer 565 at the faster SONET rate and thereby extends the duration of the inter-packet gap, as shown by the packet stream 620. Since the MAC 2 layer writes each packet more quickly, the inter-packet gaps are extended to fill the idle time. Thereafter, the PE-PHY2 layer reads the packets out of the elastic FIFO buffer 565 at the slower rate of the egress local area network 160 and in order to keep up with the packet rate, it must delete some of the idle symbols form the inter-packet gap, as shown by the packet stream 630. When the PE-PHY2 layer deletes some idle symbols, the size of the egress inter-packet gap is effectively reduced such that it is smaller than the ingress inter-packet gap during the worst case condition where the ingress frequency is greater than the egress frequency while running at full bandwidth.

For a discussion of a suitable system for aggregating packets over a transport network 150, see, for example, U.S. patent application Ser. No. 10/285,221, filed Oct. 31, 2002, entitled "Method for Flow Control of Packets Aggregated from Multiple Logical Ports Over a Transport Link," incorporated by reference herein.

It is to be understood that the embodiments and variations shown and described herein are merely illustrative of the principles of this invention and that various modifications may be implemented by those skilled in the art without departing from the scope and spirit of the invention.

We claim:

1. A method for compensating for a frequency offset between an ingress local area network and an egress local area network communicating over a transport network, said ingress local area network employing an ingress inter-packet gap between each packet in a packet flow, said method comprising the steps of:
   receiving a plurality of packets over said transport network originating from said ingress local area network; and
   providing said plurality of received packets to said egress local area network with an egress inter-packet gap between each of said received packets, wherein a size of said egress inter-packet gap is decreased to compensate for said frequency offset when said in said local area network is faster than said egress local area network and is increased to compensate for said frequency offset when said egress local area network is faster than said ingress local area network.

2. The method of claim 1, wherein a frequency of said ingress local area network exceeds a frequency of said egress local area network and said providing step further comprises the step of reducing said size of said egress inter-packet gap.

3. The method of claim 1, wherein a frequency of said egress local area network exceeds a frequency of said ingress local area network and said providing step further comprises the step of increasing said size of said egress inter-packet gap.

4. The method of claim 1, wherein said size of said egress inter-packet gap is statically configured based on said frequency offset.

5. The method of claim 1, wherein said size of said egress inter-packet gap is dynamically adjusted based on a fill level of a buffer associated with an egress port of said transport network.

6. The method of claim 1, wherein said size of said egress inter-packet gap is dynamically adjusted to prevent a buffer associated with an egress port of said transport network from overflowing.

7. The method of claim 1, wherein said size of said egress inter-packet gap is reduced by deleting idle symbols from an extended inter-packet gap.

8. A method for compensating for a frequency of offset between an ingress local area network and an egress local area network communicating over a transport network, said ingress local area network employing an ingress inter-packet gap between each packet in a packet flow, said method comprising the steps of:
   receiving a plurality of packets over said transport network originating from said ingress local area network; and
   providing said plurality of received packets to said egress local area network with an egress inter-packet gap between each of said received packets, wherein a size of said egress inter-packet gap is less than a size of said ingress inter-packet gap when said ingress local area network is faster than said egress local area network and is greater than a size of said inter-packet gap when said egress local area network is faster than said ingress local area network.

9. The method of claim 8, wherein said size of said egress inter-packet gap is statically configured based on an expected frequency offset.

10. A method for compensating for a frequency offset between an ingress local area network and an egress local area network communicating over a transport network, said ingress local area network employing an ingress inter-packet gap between each packet in a packet flow, said method comprising the steps of:
    buffering a plurality of packets received over said transport network originating from said ingress local area network in an egress buffer;
    monitoring a fill level of said egress buffer; and
    providing said plurality of received packets to said egress local area network with an egress inter-packet gap between each of said received packets, wherein a size of said egress inter-packet gap is decreased based on said fill level when said ingress local area network is faster than said egress local area network and is increased based on said fill level when said egress local area network is faster than said ingress local area network.

11. The method of claim 10, wherein said size of said egress inter-packet gap is adjusted to prevent said egress buffer from overflowing.

12. A method for compensating for a frequency offset between an ingress local area network and an egress local area network communicating over a transport network, said ingress local area network employing an ingress inter-packet gap between each packet in a packet flow, said method comprising the steps of:
    buffering a plurality of packets received over said transport network originating from said ingress local area network in a first egress buffer;
    writing said plurality of packets from said fist egress buffer in a second egress buffer at a rate associated with said transport network together with an inter-packet gap separating each packet; and
    providing said plurality of received packets to said egress local area network with an egress inter-packet gap between each of said received packets, wherein a size of said egress inter-packet gap is reduced by deleting one or more idle symbols from said inter-packet gap when said ingress local area network is faster than said egress local area network and is increased by inserting one or more idle symbols in said inter-packet gap when said egress local area network is faster than said ingress local area network.

13. An apparatus for compensating for a frequency offset between an ingress local area network and an egress local area network communicating over a transport network, said ingress local area network employing an ingress inter-packet gap between each packet in a packet flow, said apparatus comprising:
    a port for receiving a plurality of packets over said transport network originating from said ingress local area network; and
    means for providing said plurality of received packets to said egress local area network with an egress inter-packet gap between each of said received packets, wherein a size of said egress inter-packet gap is decreased to compensate for said frequency offset when said ingress local area network is faster than said egress local area network and is increased to compensate for said frequency offset when said egress local area network is faster than said ingress local area network.

14. The apparatus of claim 13, wherein a frequency of said ingress local area network exceeds a frequency of said egress local area network and said means for providing further comprises means for reducing said size of said egress inter-packet gap.

15. The apparatus of claim 13, wherein a frequency of said egress local area network exceeds a frequency of said ingress local area network and wherein means for providing further comprises means for increasing said size of said egress inter-packet gap.

16. The apparatus of claim 13, wherein said size of said egress inter-packet gap is statically configured based on said frequency offset.

17. The apparatus of claim 13, wherein said size of said egress inter-packet gap is dynamically adjusted based on a fill level of a buffer associated with an egress port of said transport network.

18. The apparatus of claim 13, wherein said size of said egress inter-packet gap is dynamically adjusted to prevent a buffer associated with an egress port of said transport network from overflowing.

19. The apparatus of claim 13, wherein said egress inter-packer gap is inserted by provider equipment between said transport network and said egress local area network.

20. The apparatus of claim 13, wherein said size of said egress inter-packet gap is reduced by deleting idle symbols from an extended inter-packet gap.

* * * * *

UNITED STATES PATENT AND TRADEMARK OFFICE
CERTIFICATE OF CORRECTION

| | | |
|---|---|---|
| PATENT NO. | : 7,593,327 B2 | Page 1 of 1 |
| APPLICATION NO. | : 10/643005 | |
| DATED | : September 22, 2009 | |
| INVENTOR(S) | : Mark A. Bordogna | |

It is certified that error appears in the above-identified patent and that said Letters Patent is hereby corrected as shown below:

In claim 1, column 7, line 30, "when said in said" should be replaced by -- when said ingress --.

In claim 8, column 7, line 57, "frequency of offset" should be replaced by -- frequency offset --.

In claim 12, column 8, line 40, "fist" should be replaced by -- first --.

Signed and Sealed this

Fourth Day of December, 2012

David J. Kappos
*Director of the United States Patent and Trademark Office*